(12) United States Patent
Zeng et al.

(10) Patent No.: US 11,791,911 B2
(45) Date of Patent: Oct. 17, 2023

(54) METHOD AND APPARATUS FOR DETECTING SIGNAL PROPAGATION TYPE (71) Applicant: Robert Bosch GmbH, Stuttgart (DE)

(72) Inventors: Zhuoqi Zeng, Shanghai (CN); Steven Liu, Shanghai (CN); Huajun Yu, Shanghai (CN); William Wang, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 487 days.

(21) Appl. No.: 17/268,760

(22) PCT Filed: Aug. 14, 2018

(86) PCT No.: PCT/CN2018/100389
§ 371 (c)(1),
(2) Date: Feb. 16, 2021

(87) PCT Pub. No.: WO2020/034085
PCT Pub. Date: Feb. 20, 2020

(65) Prior Publication Data
US 2021/0325523 A1 Oct. 21, 2021

(51) Int. Cl.
H04B 17/21 (2015.01)
H04B 17/27 (2015.01)
(Continued)

(52) U.S. Cl.
CPC ............ H04B 17/21 (2015.01); G01S 5/011 (2020.05); G01S 5/0218 (2020.05);
(Continued)

(58) Field of Classification Search
None
See application file for complete search history.

(56) References Cited

U.S. PATENT DOCUMENTS 7,577,190 B2 * 8/2009 Denk .................... H04B 17/373
375/224
9,002,286 B2 * 4/2015 Maran ................... H04B 17/373
455/67.11
(Continued)

FOREIGN PATENT DOCUMENTS

CN 101526605 A 9/2009
CN 103399297 A 11/2013
(Continued)

OTHER PUBLICATIONS

Van de Velde et al., "Improved Censoring and NLOS Avoidance for Wireless Localization in Dense Networks", IEEE Journal on Selected Areas in Communications, vol. 33, No. 11, 2015, pp. 2302-2312.
(Continued)

Primary Examiner — Gregory C. Issing
(74) Attorney, Agent, or Firm — Michael Best & Friedrich LLP (57) ABSTRACT The present invention relates to a method and apparatus for detecting a signal propagation type, the method comprises: when a positioning base station of an ultra-wideband positioning system currently receives a pulse response from a positioning tag, computing an actual value of a specified feature of the received pulse response at least using the received pulse response; selecting, for the specified feature, a predictive model for predicting an adopted value of the specified feature at a future moment on the basis of an adopted value of the specified feature at a historical moment;
(Continued)

using the predictive model selected for the specified feature to acquire an adopted value of the specified feature at a future moment, to serve as a predicted value of the specified feature of the received pulse response; and determining the current type of signal propagation between the positioning base station and positioning tag on the basis of the actual value and predicted value of the specified feature of the received pulse response and the predictive model selected for the specified feature. Using the method and apparatus, it is possible to detect the type of signal propagation between the positioning base station and positioning tag of the UWB positioning system.

12 Claims, 4 Drawing Sheets

(51) Int. Cl.
    *H04B 17/391* (2015.01)
    *G01S 5/02* (2010.01)
    *G01S 5/00* (2006.01)
    *G01S 13/02* (2006.01)
(52) U.S. Cl.
    CPC ............ *G01S 5/0294* (2013.01); *H04B 17/27* (2015.01); *H04B 17/391* (2015.01); *G01S 13/0218* (2013.01)

(56) References Cited

U.S. PATENT DOCUMENTS 10,466,345 B1 * 11/2019 Sarrigeorgidis ...... G01S 5/0221
2008/0032709 A1 2/2008 Guvenc et al.

FOREIGN PATENT DOCUMENTS

| CN | 105911539 A | 8/2016 | |
|---|---|---|---|
| CN | 106162555 A | 11/2016 | |
| CN | 106455059 A | 2/2017 | |
| CN | 107037402 A | 8/2017 | |
| EP | 3079381 A1 | 10/2016 | |
| WO | 2008017033 A2 | 2/2008 | |
| WO | WO-2017185664 A1 * | 11/2017 | ........... G01S 5/0252 |

OTHER PUBLICATIONS

Chinese Patent Office Search Report for Application No. 2018800966051 dated Feb. 8, 2023 (4 pages including statement of relevance).
Translation of International Search Report for Application No. PCT/CN2018/100389 dated Mar. 28, 2019 (2 pages).

* cited by examiner

METHOD AND APPARATUS FOR DETECTING SIGNAL PROPAGATION TYPE

BACKGROUND OF THE INVENTION

The present invention relates to the field of ultra-wideband (UWB) positioning, in particular to a method and apparatus for detecting a signal propagation type, a computing device and a machine-readable storage medium.

UWB positioning is a technology for positioning an object indoors using an extremely narrow pulse response and a bandwidth exceeding 1 GHz. A UWB positioning system comprises multiple positioning base stations, and a positioning tag placed on an object to be positioned. The positioning tag transmits a pulse signal, which becomes a pulse response upon reaching the positioning base stations after channel modulation. The UWB positioning system uses the pulse response received by the positioning base stations from the positioning tag to determine the position of the object.

When signal propagation between the positioning base station and positioning tag is line-of-sight propagation unobstructed by any obstacle, the UWB positioning system can obtain an accurate position of the object, but if signal propagation between the positioning base station and positioning tag is non-line-of-sight propagation obstructed by an obstacle, then the position obtained by the UWB positioning system is generally inaccurate.

Thus, in UWB positioning, it is very important that the type of signal propagation between the positioning base station and positioning tag be identified.

SUMMARY OF THE INVENTION

The embodiments of the present invention provide a method and apparatus for detecting a signal propagation type, a computing device and a machine-readable storage medium, which are capable of detecting the type of signal propagation between a positioning base station and a positioning tag of a UWB positioning system.

A method for detecting a signal propagation type according to an embodiment of the present invention comprises: when a certain positioning base station of an ultra-wideband positioning system currently receives a pulse response from a certain positioning tag, computing a value of a specified feature at least using the received pulse response, to serve as an actual value of the specified feature of the received pulse response; selecting, for the specified feature, a predictive model for predicting an adopted value of the specified feature at a future moment on the basis of an adopted value of the specified feature at a historical moment, according to the type of signal propagation between said certain positioning base station and said certain positioning tag determined last time; using the predictive model selected for the specified feature to acquire an adopted value of the specified feature at a future moment, to serve as a predicted value of the specified feature of the received pulse response, by regarding an actual value of the specified feature of a historical pulse response received by the positioning base station from the positioning tag previously as an adopted value of the specified feature at a historical moment; and determining the current type of signal propagation between said certain positioning base station and said certain positioning tag on the basis of the actual value and predicted value of the specified feature of the received pulse response and the predictive model selected for the specified feature.

An apparatus for detecting a signal propagation type according to an embodiment of the present invention comprises: a computing module, configured to compute, when a certain positioning base station of an ultra-wideband positioning system currently receives a pulse response from a certain positioning tag, a value of a specified feature at least using the received pulse response, to serve as an actual value of the specified feature of the received pulse response; a selecting module, configured to select, for the specified feature, a predictive model for predicting an adopted value of the specified feature at a future moment on the basis of an adopted value of the specified feature at a historical moment, according to the type of signal propagation between said certain positioning base station and said certain positioning tag determined last time; an acquiring module, configured to use the predictive model selected for the specified feature to acquire an adopted value of the specified feature at a future moment, to serve as a predicted value of the specified feature of the received pulse response, by regarding an actual value of the specified feature of a historical pulse response received by the positioning base station from the positioning tag previously as an adopted value of the specified feature at a historical moment; and a determining module, configured to determine the current type of signal propagation between said certain positioning base station and said certain positioning tag on the basis of the actual value and predicted value of the specified feature of the received pulse response and the predictive model selected for the specified feature.

A computing device according to an embodiment of the present invention comprises: a processor; and a memory, in which is stored an executable instruction which, when executed, causes the processor to execute the method described above.

A machine-readable storage medium according to an embodiment of the present invention has an executable instruction thereon; when the executable instruction is executed, a machine is caused to execute the method described above.

According to the solution in embodiments of the present invention, when the positioning base station of the UWB positioning system currently receives a pulse response from the positioning tag, the actual value of the specified feature of the received pulse response is computed at least using the received pulse response, the predictive model is used to acquire the predicted value of the specified feature of the received pulse response, and the actual value and predicted value of the specified feature of the received pulse response and the predictive model used are used to determine the current type of signal propagation between the positioning base station and the positioning tag; thus, the solution in embodiments of the present invention can detect the type of signal propagation between the positioning base station and positioning tag of the UWB positioning system.

BRIEF DESCRIPTION OF THE DRAWINGS

Other features, characteristics, benefits and advantages of the present invention will become more obvious through the following detailed description, which makes reference to the drawings. Here.

DETAILED DESCRIPTION

Various embodiments of the present invention are described in detail below with reference to the drawings.

Figure 1:
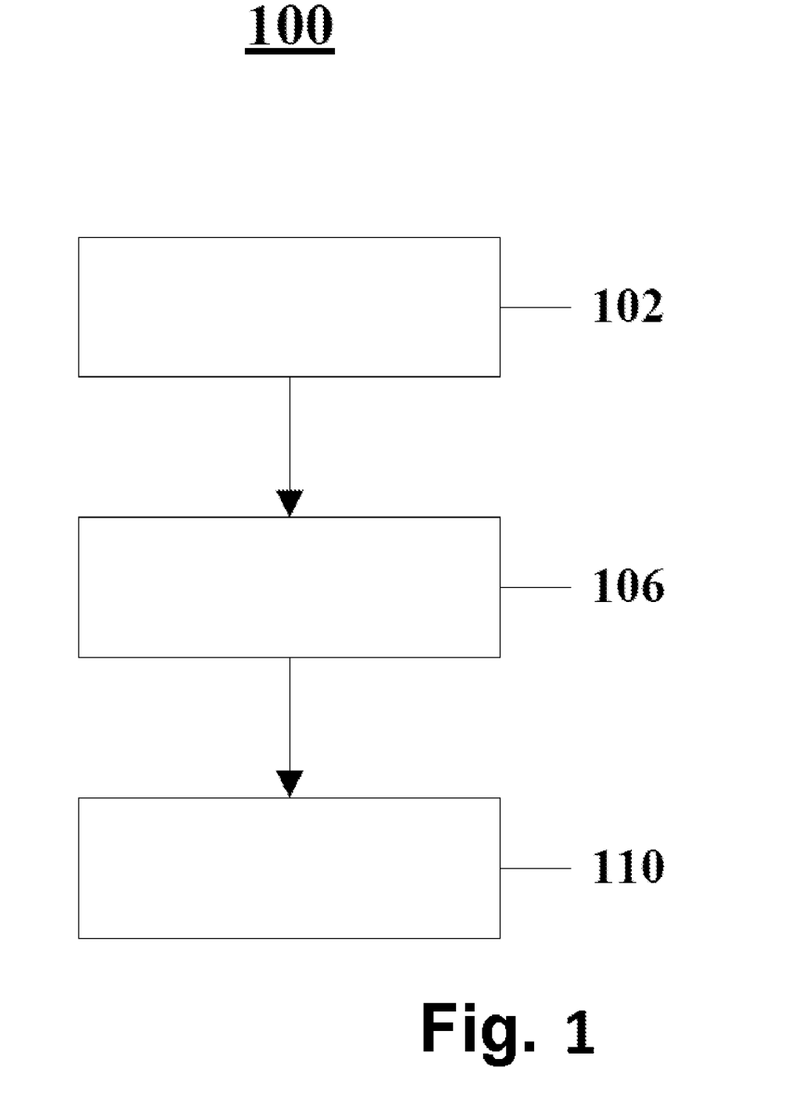
FIG. 1 shows a general flow chart of a method for training a predictive model according to an embodiment of the present invention.

FIG. 1 shows a general flow chart of a method for creating a predictive model according to an embodiment of the present invention. The method 100 shown in FIG. 1 may be realized by any computing device having computing capability. The computing device may be, but is not limited to, a desktop computer, notebook computer, tablet computer, server or smartphone, etc.

As shown in FIG. 1, in box 102, four pulse response sets are collected.

The four pulse response sets collected comprise a first pulse response set C1, a second pulse response set C2, a third pulse response set C3 and a fourth pulse response set C4. The first pulse response set C1 is collected in the case where signal propagation of the UWB positioning system changes from line-of-sight propagation to line-of-sight propagation. The second pulse response set C2 is collected in the case where signal propagation of the UWB positioning system changes from line-of-sight propagation to non-line-of-sight propagation. The third pulse response set C3 is collected in the case where signal propagation of the UWB positioning system changes from non-line-of-sight propagation to non-line-of-sight propagation. The fourth pulse response set C4 is collected in the case where signal propagation of the UWB positioning system changes from non-line-of-sight propagation to line-of-sight propagation.

The first pulse response set C1 comprises multiple pulse response groups. Each pulse response group in the first pulse response set C1 comprises multiple first pulse responses and a second pulse response, wherein the multiple first pulse responses are pulse responses received successively by a certain positioning base station from a certain positioning tag in the case where signal propagation between said certain positioning base station and said certain positioning tag of the UWB positioning system located in a certain scenario (for example but not limited to a school, airport, train station, car park, shopping mall, theater or cinema, etc.) is line-of-sight propagation, and the second pulse response is a pulse response received by said certain positioning base station from said certain positioning tag after signal propagation between said certain positioning base station and said certain positioning tag changes to line-of-sight propagation.

The second pulse response set C2 comprises multiple pulse response groups. Each pulse response group in the second pulse response set C2 comprises multiple first pulse responses and a second pulse response, wherein the multiple first pulse responses are pulse responses received successively by a certain positioning base station from a certain positioning tag in the case where signal propagation between said certain positioning base station and said certain positioning tag of the UWB positioning system located in a certain scenario is line-of-sight propagation, and the second pulse response is a pulse response received by said certain positioning base station from said certain positioning tag after signal propagation between said certain positioning base station and said certain positioning tag changes to non-line-of-sight propagation.

The third pulse response set C3 comprises multiple pulse response groups. Each pulse response group in the third pulse response set C3 comprises multiple first pulse responses and a second pulse response, wherein the multiple first pulse responses are pulse responses received successively by a certain positioning base station from a certain positioning tag in the case where signal propagation between said certain positioning base station and said certain positioning tag of the UWB positioning system located in a certain scenario is non-line-of-sight propagation, and the second pulse response is a pulse response received by said certain positioning base station from said certain positioning tag after signal propagation between said certain positioning base station and said certain positioning tag changes to non-line-of-sight propagation.

The fourth pulse response set C4 comprises multiple pulse response groups. Each pulse response group in the fourth pulse response set C4 comprises multiple first pulse responses and a second pulse response, wherein the multiple first pulse responses are pulse responses received successively by a certain positioning base station from a certain positioning tag in the case where signal propagation between said certain positioning base station and said certain positioning tag of the UWB positioning system located in a certain scenario is non-line-of-sight propagation, and the second pulse response is a pulse response received by said certain positioning base station from said certain positioning tag after signal propagation between said certain positioning base station and said certain positioning tag changes to line-of-sight propagation.

In box 106, a value of a single specified feature SF of each pulse response in the four pulse response sets is computed.

The specified feature SF may be a feature whose value can be computed using only one pulse response. Such features for example may be, but are not limited to, distance between the positioning base station and positioning tag, received signal energy, maximum amplitude, maximum amplitude rise time, standard deviation, power difference of a first path and a strongest path, power ratio of the first path and strongest path, signal to noise ratio (SNR), form factor, received pulse peak to start time delay, mean excess delay, mean square delay spread, kurtosis, crest factor, peak to average power ratio, or skewness, etc.

The specified feature SF may also be a feature whose value can only be computed using multiple pulse responses. Such features for example may be, but are not limited to, Euclidean distance, dynamic time warping (DTW), longest common subsequence, edit distance, Chebyshev distance, Manhattan distance, Hausdorff distance, rotating wheel distance, one-way distance, cosine similarity, locality in-between polylines, or clue perceived trajectory similarity. In the case where the specified feature SF is a feature whose value can only be computed using multiple pulse responses, the value of the specified feature SF of any pulse response in the four pulse response sets is computed using said any pulse response and the pulse responses received before said any pulse response in the pulse response group containing said any pulse response. For example but without limitation, supposing that the specified feature SF is Euclidean distance, a pulse response Tk is located in a pulse response group T, and pulse responses received before pulse response Tk in the pulse response group T are pulse responses Tc, Te and Tf, then the value of the Euclidean distance of pulse response Tk is equal to the mean value of the Euclidean distance between pulse responses Tk and Tc, the Euclidean distance between pulse responses Tk and Te, and the Euclidean distance between pulse responses Tk and Tf.

In box 110, the four pulse response sets are used to obtain four predictive models M1-M4 by training.

All of the pulse response groups contained in the first pulse response set C1 are used to obtain predictive model M1 by training; this predictive model is used to predict an adopted value of the specified feature SF at a single future moment on the basis of an adopted value of the specified feature SF at a historical moment. When training the predictive model M1, for each pulse response group C1-$i$ in the first pulse response set C1, the values of the specified feature SF of the first pulse responses included in the pulse response group C1-$i$ are regarded as adopted values of the specified feature SF at historical moments, and the value of the specified feature SF of the second pulse response included in the pulse response group C1-$i$ is regarded as the adopted value of the specified feature SF at a single future moment. The first pulse responses and second pulse response included in each pulse response group C1-$i$ in the first pulse response set C1 are collected in the cases where signal propagation between the positioning base station and positioning tag is line-of-sight propagation, and signal propagation between the positioning base station and positioning tag is line-of-sight propagation, respectively; thus, the signal propagation change situation suitable for prediction by predictive model M1 is that in which signal propagation between the positioning base station and positioning tag is line-of-sight propagation before the change and line-of-sight propagation after the change.

All of the pulse response groups contained in the second pulse response set C2 are used to obtain predictive model M2 by training; this predictive model is used to predict an adopted value of the specified feature SF at a single future moment on the basis of an adopted value of the specified feature SF at a historical moment. When training the predictive model M2, for each pulse response group C2-$i$ in the second pulse response set C2, the values of the specified feature SF of the first pulse responses included in the pulse response group C2-$i$ are regarded as adopted values of the specified feature SF at historical moments, and the value of the specified feature SF of the second pulse response included in the pulse response group C2-$i$ is regarded as the adopted value of the specified feature SF at a single future moment. The first pulse responses and second pulse response included in each pulse response group C2-$i$ in the second pulse response set C2 are collected in the cases where signal propagation between the positioning base station and positioning tag is line-of-sight propagation, and signal propagation between the positioning base station and positioning tag is non-line-of-sight propagation, respectively; thus, the signal propagation change situation suitable for prediction by predictive model M2 is that in which signal propagation between the positioning base station and positioning tag is line-of-sight propagation before the change and non-line-of-sight propagation after the change.

All of the pulse response groups contained in the third pulse response set C3 are used to obtain predictive model M3 by training; this predictive model is used to predict an adopted value of the specified feature SF at a single future moment on the basis of an adopted value of the specified feature SF at a historical moment. When training the predictive model M3, for each pulse response group C3-$i$ in the third pulse response set C3, the values of the specified feature SF of the first pulse responses included in the pulse response group C3-$i$ are regarded as adopted values of the specified feature SF at historical moments, and the value of the specified feature SF of the second pulse response included in the pulse response group C3-$i$ is regarded as the adopted value of the specified feature SF at a single future moment. The first pulse responses and second pulse response included in each pulse response group C3-$i$ in the third pulse response set C3 are collected in the cases where signal propagation between the positioning base station and positioning tag is non-line-of-sight propagation, and signal propagation between the positioning base station and positioning tag is non-line-of-sight propagation, respectively; thus, the signal propagation change situation suitable for prediction by predictive model M3 is that in which signal propagation between the positioning base station and positioning tag is non-line-of-sight propagation before the change and non-line-of-sight propagation after the change.

All of the pulse response groups contained in the fourth pulse response set C4 are used to obtain predictive model M4 by training; this predictive model is used to predict an adopted value of the specified feature SF at a single future moment on the basis of an adopted value of the specified feature SF at a historical moment. When training the predictive model M4, for each pulse response group C4-$i$ in the fourth pulse response set C4, the values of the specified feature SF of the first pulse responses included in the pulse response group C4-$i$ are regarded as adopted values of the specified feature SF at historical moments, and the value of the specified feature SF of the second pulse response included in the pulse response group C4-$i$ is regarded as the adopted value of the specified feature SF at a single future moment. The first pulse responses and second pulse response included in each pulse response group C4-$i$ in the fourth pulse response set C4 are collected in the cases where signal propagation between the positioning base station and positioning tag is non-line-of-sight propagation, and signal propagation between the positioning base station and positioning tag is line-of-sight propagation, respectively; thus, the signal propagation change situation suitable for prediction by predictive model M4 is that in which signal propagation between the positioning base station and positioning tag is non-line-of-sight propagation before the change and line-of-sight propagation after the change.

The predictive models M1-M4 may be realized using any suitable predictive algorithm; the predictive algorithm used may for example be, but is not limited to, a time sequence analysis method (e.g. moving average method or autoregressive moving average method, etc.), machine learning algorithm or fitting algorithm, etc.

Figure 2:
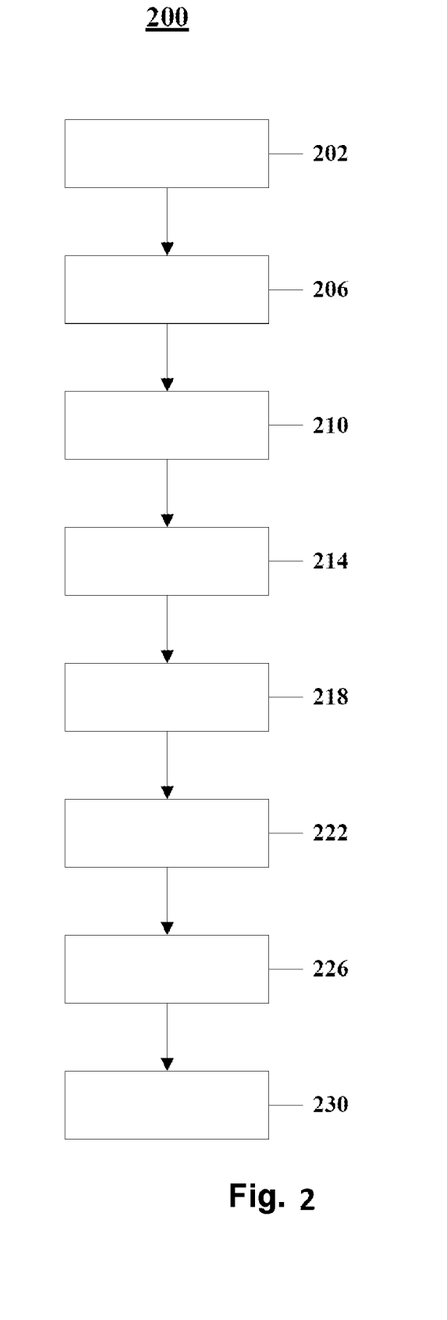
FIG. 2 shows a general flow chart of a method for detecting a signal propagation type according to an embodiment of the present invention.

FIG. 2 shows a general flow chart of a method for detecting a signal propagation type according to a first embodiment of the present invention. The method 200 shown in FIG. 2 may be realized by any computing device having computing capability. The computing device may be, but is not limited to, a desktop computer, notebook computer, tablet computer, server or smartphone, etc.

As shown in FIG. 2, in box 202, when a certain positioning base station BSi in a UWB positioning system currently receives a pulse response Pn from a certain positioning tag TGj, a value of a specified feature SF is computed at least using the pulse response Pn, to serve as an actual value of the specified feature SF of the pulse response Pn.

As mentioned above, the specified feature SF may be a feature whose value can be computed using only one pulse response, but may also be a feature whose value can only be computed using multiple pulse responses. Here, if the specified feature SF is a feature whose value can be computed using only one pulse response, then the pulse response Pn alone is used to compute the value of the specified feature SF. If the specified feature SF is a feature whose value can only be computed using multiple pulse responses, then the pulse response Pn and one or more pulse responses received by the positioning base station BSi from the positioning tag TGj previously (i.e. before receiving the specified feature SF) are used to compute the value of the specified feature SF.

In box 206, a predictive model is selected from the predictive models M1-M4 such that, in the signal propagation change situation suitable for prediction by the selected predictive model, signal propagation between the positioning base station and positioning tag before the change is of the same type as signal propagation between the positioning base station BSi and positioning tag TGj determined last time.

Here, if the type of signal propagation between the positioning base station BSi and positioning tag TGj determined last time was line-of-sight propagation, then predictive model M1 or M2 is selected, because signal propagation between the positioning base station and positioning tag is line-of-sight propagation before the change in the signal propagation change situation suitable for prediction by predictive models M1 and M2. If the type of signal propagation between the positioning base station BSi and positioning tag TGj determined last time was non-line-of-sight propagation, then predictive model M3 or M4 is selected, because signal propagation between the positioning base station and positioning tag is non-line-of-sight propagation before the change in the signal propagation change situation suitable for prediction by predictive models M3 and M4.

In box 210, respective actual values of the specified feature SF of a number of historical pulse responses HP, received by the positioning base station BSi from the positioning tag TGj previously (i.e. before receiving the pulse response Pn), are found.

In box 214, the respective actual values of the specified feature SF of the number of historical pulse responses HP are regarded as adopted values of the specified feature SF at historical moments, and inputted to the predictive model selected in box 206, to obtain an adopted value of the specified feature SF at a single future moment.

In box 218, the adopted value of the specified feature SF at a single future moment obtained in box 214 is used as a predicted value of the specified feature SF of the pulse response Pn.

In box 222, a first determination result is acquired, indicating whether the difference between the actual value and predicted value of the specified feature SF of the pulse response Pn is smaller than a specified threshold.

In box 226, a second determination result is acquired, indicating whether the signal propagation change situation suitable for prediction by the predictive model selected in box 206 is that signal propagation between the positioning base station and positioning tag is a specific signal propagation type both before and after the change, wherein the specific signal propagation type is the type of signal propagation between the positioning base station BSi and positioning tag TGj determined last time.

In box 230, the current type of signal propagation between the positioning base station BSi and positioning tag TGj is determined according to the acquired first determination result and second determination result.

Here, when the first determination result and second determination result are both affirmative, or the first determination result and second determination result are both negative, it is determined that the current type of signal propagation between the positioning base station BSi and positioning tag TGj is the specific signal propagation type.

When the first determination result is affirmative and the second determination result is negative, or the first determination result is negative and the second determination result is affirmative, it is determined that the current type of signal propagation between the positioning base station BSi and positioning tag TGj is another signal propagation type different from the specific signal propagation type.

In this embodiment, when the positioning base station of the UWB positioning system currently receives a pulse response from the positioning tag, the actual value of the specified feature of the received pulse response is computed at least using the received pulse response, then the predictive model is used to acquire the predicted value of the specified feature of the received pulse response, and finally the actual value and predicted value of the specified feature of the received pulse response and the predictive model used are used to determine the current type of signal propagation between the positioning base station and the positioning tag; thus, the solution of this embodiment can detect the type of signal propagation between the positioning base station and positioning tag of the UWB positioning system.

Other Variants (1) Single Pulse Response and Multiple Specified Features

Those skilled in the art will understand that although, in the embodiment above, only a single specified feature SF of a single pulse response Pn currently received by the positioning base station BSi from the positioning tag TGj is used when detecting the current type of signal propagation between the positioning base station BSi and positioning tag TGj, the present invention is not limited to this. In other embodiments of the present invention, it is also possible to use multiple specified features MSF of a single pulse response Pn currently received by the positioning base station BSi from the positioning tag TGj when detecting the current type of signal propagation between the positioning base station BSi and positioning tag TGj.

In the case where multiple specified features MSF of a single pulse response Pn currently received by the positioning base station BSi from the positioning tag TGj are used to detect the current type of signal propagation between the positioning base station BSi and positioning tag TGj, each specified feature MSFi in the multiple specified features MSF may be a feature whose value can be computed using only one pulse response, but may also be a feature whose value can only be computed using multiple pulse responses, just like the specified feature SF. As in the case of the specified feature SF, four predictive models are trained for each specified feature MSFi, each predictive model being used to predict an adopted value of the specified feature MSFi at a single future moment on the basis of an adopted value of the specified feature MSFi at a historical moment, and a signal propagation change situation suitable for prediction by each predictive model being one of the following four situations: signal propagation between the positioning base station and positioning tag is line-of-sight propagation before the change and line-of-sight propagation after the change, signal propagation between the positioning base station and positioning tag is line-of-sight propagation before the change and non-line-of-sight propagation after the change, signal propagation between the positioning base station and positioning tag is non-line-of-sight propagation before the change and non-line-of-sight propagation after the change, and signal propagation between the positioning base station and positioning tag is non-line-of-sight propagation before the change and line-of-sight propagation after the change.

When the positioning base station BSi currently receives a single pulse response Pn from the positioning tag TGj, respective actual values of the multiple specified features MSF of the pulse response Pn are computed at least on the basis of the pulse response Pn, similarly to the step described in box 202. Then, for each specified feature MSFi in the multiple specified features MSF, a predictive model is selected such that, in the signal propagation change situation suitable for prediction by the selected predictive model, signal propagation between the positioning base station and positioning tag before the change is of the same type as signal propagation between the positioning base station BSi and positioning tag TGj determined last time. Next, as in boxes 210-218, respective predicted values of the multiple specified features MSF of the pulse response Pn are acquired. Next, respective first determination results of the multiple specified features MSF are acquired, the first determination result of each specified feature MSFi indicating whether the difference between the actual value and predicted value of the specified feature MSFi of the pulse response Pn is smaller than a specified threshold. Respective second determination results of the multiple specified features MSF are acquired, the second determination result of each specified feature MSFi indicating whether the signal propagation change situation suitable for prediction by the predictive model selected for the specified feature MSFi is that signal propagation between the positioning base station and positioning tag is a specific signal propagation type both before and after the change, the specific signal propagation type being the type of signal propagation between the positioning base station BSi and positioning tag TGj determined last time. Next, multiple candidate signal propagation types are acquired, each candidate signal propagation type indicating the current type of signal propagation between the positioning base station BSi and positioning tag TGj determined on the basis of the first determination result and second determination result of one of the multiple specified features MSF of the pulse response Pn. Finally, the current type of signal propagation between the positioning base station BSi and positioning tag TGj is determined using the multiple candidate signal propagation types. For example but without limitation, supposing that more than half of the multiple candidate signal propagation types are a particular kind of signal propagation (line-of-sight propagation or non-line-of-sight propagation), then the current type of signal propagation between the positioning base station BSi and positioning tag TGj is determined as being that particular kind of signal propagation.

(2) Multiple Pulse Responses and Single Specified Feature

Those skilled in the art will understand that although, in the embodiment above, only a single specified feature SF of a single pulse response Pn currently received by the positioning base station BSi from the positioning tag TGj is used when detecting the current type of signal propagation between the positioning base station BSi and positioning tag TGj, the present invention is not limited to this. In other embodiments of the present invention, it is also possible to use a single specified feature SF of each of multiple pulse responses MPn currently received by the positioning base station BSi from the positioning tag TGj when detecting the current type of signal propagation between the positioning base station BSi and positioning tag TGj.

In the case where a single specified feature SF of multiple pulse responses MPn currently received by the positioning base station BSi from the positioning tag TGj is used to detect the current type of signal propagation between the positioning base station BSi and positioning tag TGj, each pulse response group in the first to fourth pulse response sets C1-C4 comprises multiple second pulse responses, and when training the predictive models, the values of the specified feature SF of the multiple second pulse responses included in each pulse response group in each pulse response set are regarded as adopted values of the specified feature SF at multiple future moments, such that each of the predictive models M1-M4 obtained by training is used to predict adopted values of the specified feature SF at multiple future moments on the basis of an adopted value of the specified feature SF at a historical moment.

When the positioning base station BSi currently receives the multiple pulse responses MPn from the positioning tag TGj, an actual value of the specified feature SF of each pulse response MPn-$i$ in the multiple pulse responses MPn is computed at least on the basis of the pulse response MPn-$i$, to obtain respective actual values of the specified feature SF of the multiple pulse responses MPn, similarly to the step described in box 202. Next, respective actual values of the specified feature SF of a number of historical pulse responses HP, received by the positioning base station BSi from the positioning tag TGj previously, are regarded as adopted values of the specified feature SF at historical moments, and inputted to the predictive model selected in box 206, to obtain adopted values of the specified feature SF at multiple future moments, to serve as predicted values of the specified feature SF of the multiple pulse responses MPn. For example, supposing that the multiple pulse responses MPn comprise three pulse responses MP1, MP2 and MP3 received sequentially, and the predictive model is used to obtain an adopted value V1 of the specified feature SF at a first future moment, an adopted value V2 of the specified feature SF at a second future moment, and an adopted value V3 of the specified feature SF at a third future moment, then the predicted value of the specified feature SF of the pulse response MP1 is V1, the predicted value of the specified feature SF of the pulse response MP2 is V2, and the predicted value of the specified feature SF of the pulse response MP3 is V3. Next, respective first indication values of the multiple pulse responses MPn are acquired, the first indication value of each pulse response MPn-$i$ indicating the difference between the actual value and predicted value of the specified feature SF of the pulse response MPn-$i$. Then, a second indication value is computed on the basis of the first indication values of the multiple pulse responses MPn. For example, the mean value of the absolute values of the first indication values of the multiple pulse responses MPn may be computed as the second indication value. As another example, the root mean square value of the first indication values of the multiple pulse responses MPn may be computed as the second indication value. Next, a first determination result is acquired, indicating whether the second indication value is smaller than a specified threshold. A second determination result is acquired, indicating whether the signal propagation change situation suitable for prediction by the predictive model selected for the specified feature SF is that signal propagation between the positioning base station and positioning tag is a specific signal propagation type both before and after the change, the specific signal propagation type being the type of signal propagation between the positioning base station BSi and positioning tag TGj determined last time. Finally, the current type of signal propagation between the positioning base station BSi and positioning tag TGj is determined on the basis of the first determination result and the second determination result. Specifically, when the first determination result and the second determination result are both affirmative, or the first determination result and the second determination result are both negative, it is determined that the current type of signal propagation between the positioning base station BSi and positioning tag TGj is the type of signal propagation between the positioning base station BSi and positioning tag TGj determined last time. When the first determination result is affirmative and the second determination result is negative, or the first determination result is negative and the second determination result is affirmative, it is determined that the current type of signal propagation between the positioning base station BSi and positioning tag TGj is another signal propagation type different from the type of signal propagation between the positioning base station BSi and positioning tag TGj determined last time.

(3) Multiple Pulse Responses and Multiple Specified Features

Those skilled in the art will understand that although, in the embodiment above, only a single specified feature SF of a single pulse response Pn currently received by the positioning base station BSi from the positioning tag TGj is used when detecting the current type of signal propagation between the positioning base station BSi and positioning tag TGj, the present invention is not limited to this. In other embodiments of the present invention, it is also possible to use respective multiple specified features FSF of multiple pulse responses PMP currently received by the positioning base station BSi from the positioning tag TGj when detecting the current type of signal propagation between the positioning base station BSi and positioning tag TGj.

In the case where the respective multiple specified features FSF of the multiple pulse responses PMP currently received by the positioning base station BSi from the positioning tag TGj are used to detect the current type of signal propagation between the positioning base station B Si and positioning tag TGj, four predictive models are trained for each specified feature FSFi in the multiple specified features FSF, each predictive model trained for the specified feature FSFi being used to predict adopted values of the specified feature FSFi at a multiple future moments on the basis of an adopted value of the specified feature FSFi at a historical moment, and a signal propagation change situation suitable for prediction by each predictive model trained for the specified feature FSFi being one of the following four situations: signal propagation between the positioning base station and positioning tag is line-of-sight propagation before the change and line-of-sight propagation after the change, signal propagation between the positioning base station and positioning tag is line-of-sight propagation before the change and non-line-of-sight propagation after the change, signal propagation between the positioning base station and positioning tag is non-line-of-sight propagation before the change and non-line-of-sight propagation after the change, and signal propagation between the positioning base station and positioning tag is non-line-of-sight propagation before the change and line-of-sight propagation after the change.

When the positioning base station BSi currently receives the multiple pulse responses PMP from the positioning tag TGj, respective actual values of the multiple specified features FSF of each pulse response PMP-$i$ in the multiple pulse responses PMP are computed at least on the basis of the pulse response PMP-$i$, to obtain respective actual values of the multiple specified features FSF of each pulse response PMP-$i$ in the multiple pulse responses PMP, similarly to the step described in box 202. Then, a predictive model is selected for each specified feature FSFi in the multiple specified features FSF, wherein in the signal propagation change situation suitable for prediction by the selected predictive model, signal propagation between the positioning base station and positioning tag before the change is of the same type as signal propagation between the positioning base station BSi and positioning tag TGj determined last time. Next, respective actual values of each specified feature FSFi of a number of historical pulse responses HP, received by the positioning base station BSi from the positioning tag TGj previously, are regarded as adopted values of the specified feature FSFi at historical moments, and inputted to the predictive model selected for the specified feature FSFi, to obtain adopted values of the specified feature FSFi at multiple future moments, to serve as respective predicted values of the specified feature FSFi of the multiple pulse responses PMP. Next, respective first indication values of the multiple specified features FSF of each pulse response PMP-$i$ in the multiple pulse responses PMP are acquired, wherein the first indication value of each specified feature FSFi of the pulse response PMP-$i$ indicates the difference between the actual value and predicted value of the specified feature FSFi of the pulse response PMP-$i$. Next, respective second indication values of the multiple specified features FSF are acquired, wherein the second indication value of each specified feature FSFi is computed on the basis of the first indication values of the specified feature FSFi of the multiple pulse responses PMP. For example, the mean value of the absolute values of the first indication values of the specified feature FSFi of the multiple pulse responses PMP may be computed as the second indication value of the specified feature FSFi. As another example, the root mean square value of the first indication values of the specified feature FSFi of the multiple pulse responses PMP may be computed as the second indication value of the specified feature FSFi. Next, respective first determination results of the multiple specified features FSF are acquired, wherein the first determination result of each specified feature FSFi indicates whether the second indication value of the specified feature FSFi is smaller than a specified threshold. Respective second determination results of the multiple specified features FSF are acquired, wherein the second determination result of each specified feature FSFi indicates whether the signal propagation change situation suitable for prediction by the predictive model selected for the specified feature FSFi is that signal propagation between the positioning base station and positioning tag is a specific signal propagation type both before and after the change, the specific signal propagation type being the type of signal propagation between the positioning base station BSi and positioning tag TGj determined last time. Next, multiple candidate signal propagation types are acquired, wherein each candidate signal propagation type indicates the current type of signal propagation between the positioning base station BSi and positioning tag TGj determined on the basis of the first determination result and second determination result of one specified feature FSFj in the multiple specified features FSF. Finally, the current type of signal propagation between the positioning base station BSi and positioning tag TGj is determined on the basis of the multiple candidate signal propagation types. For example but without limitation, supposing that more than half of the multiple candidate signal propagation types are a specific signal propagation (line-of-sight propagation or non-line-of-sight propagation), then the current type of signal propagation between the positioning base station BSi and positioning tag TGj is determined as being that specific signal propagation.

Those skilled in the art will understand that although four predictive models are trained for each specified feature in the embodiments above, the present invention is not limited to this. In other embodiments of the present invention, it is also possible to train only two predictive models for each specified feature, wherein a signal propagation change situation suitable for prediction by one of the two predictive models is one of the following two situations: signal propagation between the positioning base station and positioning tag is line-of-sight propagation before the change and line-of-sight propagation after the change, and signal propagation between the positioning base station and positioning tag is line-of-sight propagation before the change and non-line-of-sight propagation after the change; and a signal propagation change situation suitable for prediction by the other of the two predictive models is one of the following two situations: signal propagation between the positioning base station and positioning tag is non-line-of-sight propagation before the change and non-line-of-sight propagation after the change, and signal propagation between the positioning base station and positioning tag is non-line-of-sight propagation before the change and line-of-sight propagation after the change.

Figure 3:
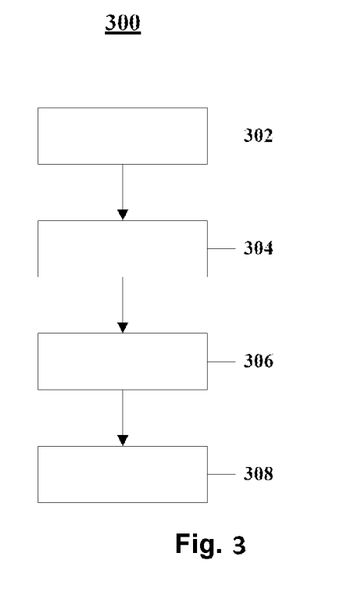
FIG. 3 shows a flow chart of a method for detecting a signal propagation type according to an embodiment of the present invention.

FIG. 3 shows a flow chart of a method for detecting a signal propagation type according to a first embodiment of the present invention. The method 300 shown in FIG. 3 may be realized by any computing device having computing capability.

As shown in FIG. 3, the method 300 may comprise: in box 302, when a certain positioning base station of a UWB positioning system currently receives a pulse response from a certain positioning tag, computing a value of a specified feature at least using the received pulse response, to serve as an actual value of the specified feature of the received pulse response.

The method 300 may further comprise: in box 304, selecting, for the specified feature, a predictive model for predicting an adopted value of the specified feature at a future moment on the basis of an adopted value of the specified feature at a historical moment, according to the type of signal propagation between said certain positioning base station and said certain positioning tag determined last time.

The method 300 may further comprise: in box 306, by regarding an actual value of the specified feature of a historical pulse response received by said certain positioning base station from said certain positioning tag previously as an adopted value of the specified feature at a historical moment, using the predictive model selected for the specified feature to acquire an adopted value of the specified feature at a future moment, to serve as a predicted value of the specified feature of the received pulse response.

The method 300 may further comprise: in box 308, determining the current type of signal propagation between said certain positioning base station and said certain positioning tag on the basis of the actual value and predicted value of the specified feature of the received pulse response and the predictive model selected for the specified feature.

In a first aspect, the specified feature only comprises a single feature, and the received pulse response only comprises a single pulse response, wherein box 308 comprises: acquiring a first determination result, indicating whether the difference between the actual value and predicted value of the single feature of the single pulse response is smaller than a specified threshold; acquiring a second determination result, indicating whether a signal propagation change situation suitable for prediction by the predictive model selected for the single feature is that signal propagation between the positioning base station and positioning tag is, both before and after the change, the type of signal propagation between said certain positioning base station and said certain positioning tag determined last time; and determining the current type of signal propagation between said certain positioning base station and said certain positioning tag on the basis of the first determination result and the second determination result.

In a second aspect, the specified feature comprises multiple specific features, the received pulse response only comprises a single pulse response, the selected predictive model comprises multiple predictive models, each predictive model being selected for one of the multiple specific features and used to predict an adopted value of said one specific feature at a single future moment on the basis of an adopted value of said one specific feature at a historical moment, and box 308 comprises: acquiring respective first determination results of the multiple specific features, wherein the first determination result of each specific feature indicates whether the difference between the actual value and predicted value of the specific feature of the single pulse response is smaller than a specified threshold; acquiring respective second determination results of the multiple specific features, wherein the second determination result of each specific feature indicates whether a signal propagation change situation suitable for prediction by the predictive model selected for the specific feature is that signal propagation between the positioning base station and positioning tag is, both before and after the change, the type of signal propagation between said certain positioning base station and said certain positioning tag determined last time; acquiring multiple candidate signal propagation types, wherein each candidate signal propagation type indicates the current type of signal propagation between said certain positioning base station and said certain positioning tag determined on the basis of the first determination result and second determination result of one of the multiple specific features; and determining the current type of signal propagation between the positioning base station and the positioning tag on the basis of the multiple candidate signal propagation types.

In a third aspect, the specified feature only comprises a single feature, the received pulse response comprises multiple pulse responses, the predictive model selected for the single feature is used to predict adopted values of the single feature at multiple future moments on the basis of an adopted value of the single feature at a historical moment, box 306 comprises: by regarding an actual value of the single feature of a historical pulse response received by said certain positioning base station from said certain positioning tag previously as an adopted value of the single feature at a historical moment, using the predictive model selected for the single feature to acquire adopted values of the single feature at multiple future moments, to serve as predicted values of the single feature of the multiple pulse responses, and box 308 comprises: acquiring respective first indication values of the multiple pulse responses, wherein the first indication value of each pulse response indicates the difference between the actual value and predicted value of the single feature of the pulse response; acquiring a second indication value, computed on the basis of the first indication values of the multiple pulse responses; acquiring a first determination result, indicating whether the second indication value is smaller than a specified threshold; acquiring a second determination result, indicating whether a signal propagation change situation suitable for prediction by the predictive model selected for the single feature is that signal propagation between the positioning base station and positioning tag is, both before and after the change, the type of signal propagation between said certain positioning base station and said certain positioning tag determined last time; and determining the current type of signal propagation between said certain positioning base station and said certain positioning tag on the basis of the first determination result and the second determination result.

In a fourth aspect, the specified feature comprises multiple specific features, the received pulse response comprises multiple pulse responses, the selected predictive model comprises multiple predictive models, each predictive model being selected for one of the multiple specific features and used to predict adopted values of said one specific feature at multiple future moments on the basis of an adopted value of said one specific feature at a historical moment, and box 306 comprises: by regarding an actual value of any one of the multiple specific features of a historical pulse response received by said certain positioning base station from said certain positioning tag previously as an adopted value of said any one specific feature at a historical moment, using the predictive model selected for said any one specific feature to acquire adopted values of said any one specific feature at multiple future moments, to serve as predicted values of said any one specific feature of the multiple pulse responses, and box 308 comprises: acquiring respective first indication values of the multiple specific features of any one of the multiple pulse responses, wherein the first indication value of each specific feature of said any one pulse response indicates the difference between the actual value and predicted value of the specific feature of said any one pulse response; acquiring respective second indication values of the multiple specific features, wherein the second indication value of each specific feature is computed on the basis of the respective first indication values of the specific feature of the multiple pulse responses; acquiring respective first determination results of the multiple specific features, the first determination result of each specific feature indicating whether the second indication value of the specific feature is smaller than a specified threshold; acquiring respective second determination results of the multiple specific features, wherein the second determination result of each specific feature indicates whether a signal propagation change situation suitable for prediction by the predictive model selected for the specific feature is that signal propagation between the positioning base station and positioning tag is, both before and after the change, the type of signal propagation between said certain positioning base station and said certain positioning tag determined last time; acquiring multiple candidate signal propagation types, wherein each candidate signal propagation type indicates the current type of signal propagation between said certain positioning base station and said certain positioning tag determined on the basis of the first determination result and second determination result of one of the multiple specific features; and determining the current type of signal propagation between said certain positioning base station and said certain positioning tag on the basis of the multiple candidate signal propagation types.

Figure 4:
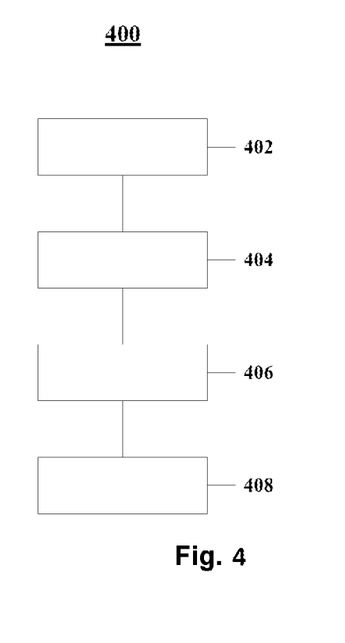
FIG. 4 shows a schematic diagram of an apparatus for detecting a signal propagation type according to an embodiment of the present invention.

FIG. 4 shows a schematic diagram of an apparatus for detecting a signal propagation type according to a first embodiment of the present invention. The apparatus 400 shown in FIG. 4 may be implemented using software, hardware or a combination of software and hardware. The apparatus 400 shown in FIG. 4 may for example be installed in any computing device having computing capability.

As shown in FIG. 4, the apparatus 400 may comprise a computing module 402, a selecting module 404, an acquiring module 406 and a determining module 408. The computing module 402 is configured to compute, when a certain positioning base station of a UWB positioning system currently receives a pulse response from a certain positioning tag, a value of a specified feature at least using the received pulse response, to serve as an actual value of the specified feature of the received pulse response. The selecting module 404 is configured to select, for the specified feature, a predictive model for predicting an adopted value of the specified feature at a future moment on the basis of an adopted value of the specified feature at a historical moment, according to the type of signal propagation between said certain positioning base station and said certain positioning tag determined last time. The acquiring module 406 is configured to use the predictive model selected for the specified feature to acquire an adopted value of the specified feature at a future moment, to serve as a predicted value of the specified feature of the received pulse response, by regarding an actual value of the specified feature of a historical pulse response received by said certain positioning base station from said certain positioning tag previously as an adopted value of the specified feature at a historical moment. The determining module 408 is configured to determine the current type of signal propagation between said certain positioning base station and said certain positioning tag on the basis of the actual value and predicted value of the specified feature of the received pulse response and the predictive model selected for the specified feature.

In a first aspect, the specified feature only comprises a single feature, and the received pulse response only comprises a single pulse response, wherein the determining module 408 comprises: a module for acquiring a first determination result, indicating whether the difference between the actual value and predicted value of the single feature of the single pulse response is smaller than a specified threshold; a module for acquiring a second determination result, indicating whether a signal propagation change situation suitable for prediction by the predictive model selected for the single feature is that signal propagation between the positioning base station and positioning tag is, both before and after the change, the type of signal propagation between said certain positioning base station and said certain positioning tag determined last time; and a module for determining the current type of signal propagation between said certain positioning base station and said certain positioning tag on the basis of the first determination result and the second determination result.

In a second aspect, the specified feature comprises multiple specific features, the received pulse response only comprises a single pulse response, the selected predictive model comprises multiple predictive models, each predictive model being selected for one of the multiple specific features and used to predict an adopted value of said one specific feature at a single future moment on the basis of an adopted value of said one specific feature at a historical moment, and the determining module 408 comprises: a module for acquiring respective first determination results of the multiple specific features, wherein the first determination result of each specific feature indicates whether the difference between the actual value and predicted value of the specific feature of the single pulse response is smaller than a specified threshold; a module for acquiring respective second determination results of the multiple specific features, wherein the second determination result of each specific feature indicates whether a signal propagation change situation suitable for prediction by the predictive model selected for the specific feature is that signal propagation between the positioning base station and positioning tag is, both before and after the change, the type of signal propagation between said certain positioning base station and said certain positioning tag determined last time; a module for acquiring multiple candidate signal propagation types, wherein each candidate signal propagation type indicates the current type of signal propagation between said certain positioning base station and said certain positioning tag determined on the basis of the first determination result and second determination result of one of the multiple specific features; and a module for determining the current type of signal propagation between the positioning base station and the positioning tag on the basis of the multiple candidate signal propagation types.

In a third aspect, the specified feature only comprises a single feature, the received pulse response comprises multiple pulse responses, the predictive model selected for the single feature is used to predict adopted values of the single feature at multiple future moments on the basis of an adopted value of the single feature at a historical moment, the acquiring module 404 is further configured to: use the predictive model selected for the single feature to acquire adopted values of the single feature at multiple future moments, to serve as predicted values of the single feature of the multiple pulse responses, by regarding an actual value of the single feature of a historical pulse response received by said certain positioning base station from said certain positioning tag previously as an adopted value of the single feature at a historical moment, and the determining module 408 comprises: a module for acquiring respective first indication values of the multiple pulse responses, wherein the first indication value of each pulse response indicates the difference between the actual value and predicted value of the single feature of the pulse response; a module for acquiring a second indication value, computed on the basis of the first indication values of the multiple pulse responses; a module for acquiring a first determination result, indicating whether the second indication value is smaller than a specified threshold; a module for acquiring a second determination result, indicating whether a signal propagation change situation suitable for prediction by the predictive model selected for the single feature is that signal propagation between the positioning base station and positioning tag is, both before and after the change, the type of signal propagation between said certain positioning base station and said certain positioning tag determined last time; and a module for determining the current type of signal propagation between said certain positioning base station and said certain positioning tag on the basis of the first determination result and the second determination result.

In a fourth aspect, the specified feature comprises multiple specific features, the received pulse response comprises multiple pulse responses, the selected predictive model comprises multiple predictive models, each predictive model being selected for one of the multiple specific features and used to predict adopted values of said one specific feature at multiple future moments on the basis of an adopted value of said one specific feature at a historical moment, and the acquiring module 404 is further configured to: by regarding an actual value of any one of the multiple specific features of a historical pulse response received by said certain positioning base station from said certain positioning tag previously as an adopted value of said any one specific feature at a historical moment, use the predictive model selected for said any one specific feature to acquire adopted values of said any one specific feature at multiple future moments, to serve as predicted values of said any one specific feature of the multiple pulse responses, and the determining module 408 comprises: a module for acquiring respective first indication values of the multiple specific features of any one of the multiple pulse responses, wherein the first indication value of each specific feature of said any one pulse response indicates the difference between the actual value and predicted value of the specific feature of said any one pulse response; a module for acquiring respective second indication values of the multiple specific features, wherein the second indication value of each specific feature is computed on the basis of the respective first indication values of the specific feature of the multiple pulse responses; a module for acquiring respective first determination results of the multiple specific features, the first determination result of each specific feature indicating whether the second indication value of the specific feature is smaller than a specified threshold; a module for acquiring respective second determination results of the multiple specific features, wherein the second determination result of each specific feature indicates whether a signal propagation change situation suitable for prediction by the predictive model selected for the specific feature is that signal propagation between the positioning base station and positioning tag is, both before and after the change, the type of signal propagation between said certain positioning base station and said certain positioning tag determined last time; a module for acquiring multiple candidate signal propagation types, wherein each candidate signal propagation type indicates the current type of signal propagation between said certain positioning base station and said certain positioning tag determined on the basis of the first determination result and second determination result of one of the multiple specific features; and a module for determining the current type of signal propagation between said certain positioning base station and said certain positioning tag on the basis of the multiple candidate signal propagation types.

Figure 5:
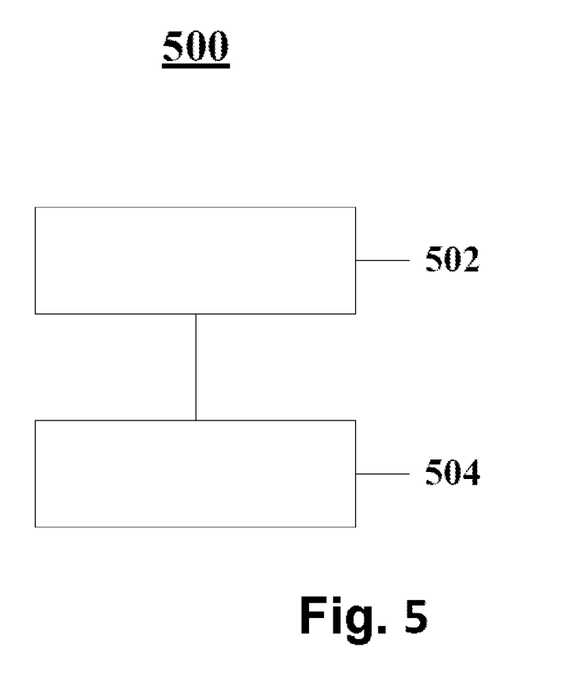
FIG. 5 shows a schematic diagram of a computing device according to an embodiment of the present invention.

FIG. 5 shows a schematic diagram of a computing device according to an embodiment of the present invention. As shown in FIG. 5, the computing device 500 may comprise a processor 502 and a memory 504. Stored in the memory 504 is an executable instruction which, when executed, causes the processor 502 to execute the method described above.

Also provided in an embodiment of the present invention is a machine-readable storage medium, having an executable instruction thereon; when the executable instruction is executed, a machine is caused to execute the method described above.

Those skilled in the art will understand that various alterations, amendments and changes could be made to all of the embodiments disclosed above without deviating from the substance of the invention; all such alterations, amendments and changes should fall within the scope of protection of the present invention. Thus, the scope of protection of the present invention is defined by the attached claims.

The invention claimed is:

1. A method for detecting a signal propagation type, comprising:
when a certain positioning base station of an ultra-wideband positioning system currently receives a pulse response from a certain positioning tag, computing a value of a specified feature at least using the received pulse response, to serve as an actual value of the specified feature of the received pulse response;
selecting, for the specified feature, a predictive model for predicting an adopted value of the specified feature at a future moment on the basis of an adopted value of the specified feature at a historical moment, according to the type of signal propagation between said certain positioning base station and said certain positioning tag determined last time;

using the predictive model selected for the specified feature to acquire an adopted value of the specified feature at a future moment, to serve as a predicted value of the specified feature of the received pulse response, by regarding an actual value of the specified feature of a historical pulse response received by said certain positioning base station from said certain positioning tag previously as an adopted value of the specified feature at a historical moment; and determining the current type of signal propagation between said certain positioning base station and said certain positioning tag on the basis of the actual value and predicted value of the specified feature of the received pulse response and the predictive model selected for the specified feature.

2. The method as claimed in claim 1, wherein
the specified feature only comprises a single feature, and the received pulse response only comprises a single pulse response, wherein the step of determining the current type of signal propagation between said certain positioning base station and said certain positioning tag comprises:

acquiring a first determination result, indicating whether the difference between the actual value and predicted value of the single feature of the single pulse response is smaller than a specified threshold;

acquiring a second determination result, indicating whether a signal propagation change situation suitable for prediction by the predictive model selected for the single feature is that signal propagation between the positioning base station and positioning tag is, both before and after the change, the type of signal propagation between said certain positioning base station and said certain positioning tag determined last time; and determining the current type of signal propagation between said certain positioning base station and said certain positioning tag on the basis of the first determination result and the second determination result.

3. The method as claimed in claim 1, wherein
the specified feature comprises multiple specific features, the received pulse response only comprises a single pulse response, the selected predictive model comprises multiple predictive models, each predictive model being selected for one of the multiple specific features and used to predict an adopted value of said one specific feature at a single future moment on the basis of an adopted value of said one specific feature at a historical moment, and the step of determining the current type of signal propagation between said certain positioning base station and said certain positioning tag comprises:

acquiring respective first determination results of the multiple specific features, wherein the first determination result of each specific feature indicates whether the difference between the actual value and predicted value of the specific feature of the single pulse response is smaller than a specified threshold;

acquiring respective second determination results of the multiple specific features, wherein the second determination result of each specific feature indicates whether a signal propagation change situation suitable for prediction by the predictive model selected for the specific feature is that signal propagation between the positioning base station and positioning tag is, both before and after the change, the type of signal propagation between said certain positioning base station and said certain positioning tag determined last time;

acquiring multiple candidate signal propagation types, wherein each candidate signal propagation type indicates the current type of signal propagation between said certain positioning base station and said certain positioning tag determined on the basis of the first determination result and second determination result of one of the multiple specific features; and determining the current type of signal propagation between the positioning base station and the positioning tag on the basis of the multiple candidate signal propagation types.

4. The method as claimed in claim 1, wherein
the specified feature only comprises a single feature,
the received pulse response comprises multiple pulse responses, the predictive model selected for the single feature is used to predict adopted values of the single feature at multiple future moments on the basis of an adopted value of the single feature at a historical moment, the step of using the predictive model selected for the specified feature to acquire an adopted value of the specified feature at a future moment comprises: using the predictive model selected for the single feature to acquire adopted values of the single feature at multiple future moments, to serve as predicted values of the single feature of the multiple pulse responses, by regarding an actual value of the single feature of a historical pulse response received by said certain positioning base station from said certain positioning tag previously as an adopted value of the single feature at a historical moment, and the step of determining the current type of signal propagation between said certain positioning base station and said certain positioning tag comprises:

acquiring respective first indication values of the multiple pulse responses, wherein the first indication value of each pulse response indicates the difference between the actual value and predicted value of the single feature of the pulse response;

acquiring a second indication value, computed on the basis of the first indication values of the multiple pulse responses;

acquiring a first determination result, indicating whether the second indication value is smaller than a specified threshold;

acquiring a second determination result, indicating whether a signal propagation change situation suitable for prediction by the predictive model selected for the single feature is that signal propagation between the positioning base station and positioning tag is, both before and after the change, the type of signal propagation between said certain positioning base station and said certain positioning tag determined last time; and determining the current type of signal propagation between said certain positioning base station and said certain positioning tag on the basis of the first determination result and the second determination result.

5. The method as claimed in claim 1, wherein
the specified feature comprises multiple specific features,
the received pulse response comprises multiple pulse responses, the selected predictive model comprises multiple predictive models, each predictive model being selected for one of the multiple specific features and used to predict an adopted value of said one specific feature at multiple future moments on the basis of an adopted value of said one specific feature at a historical moment, the step of using the predictive model selected for the specified feature to acquire an adopted value of the specified feature at a future moment comprises: by regarding an actual value of any one of the multiple specific features of a historical pulse response received by said certain positioning base station from said certain positioning tag previously as an adopted value of said any one specific feature at a historical moment, using the predictive model selected for said any one specific feature to acquire adopted values of said any one specific feature at multiple future moments, to serve as predicted values of said any one specific feature of the multiple pulse responses, and the step of determining the current type of signal propagation between said certain positioning base station and said certain positioning tag comprises:

acquiring respective first indication values of the multiple specific features of any one of the multiple pulse responses, wherein the first indication value of each specific feature of said any one pulse response indicates the difference between the actual value and predicted value of the specific feature of said any one pulse response;

acquiring respective second indication values of the multiple specific features, wherein the second indication value of each specific feature is computed on the basis of the respective first indication values of the specific feature of the multiple pulse responses;

acquiring respective first determination results of the multiple specific features, the first determination result of each specific feature indicating whether the second indication value of the specific feature is smaller than a specified threshold;

acquiring respective second determination results of the multiple specific features, wherein the second determination result of each specific feature indicates whether a signal propagation change situation suitable for prediction by the predictive model selected for the specific feature is that signal propagation between the positioning base station and positioning tag is, both before and after the change, the type of signal propagation between said certain positioning base station and said certain positioning tag determined last time;

acquiring multiple candidate signal propagation types, wherein each candidate signal propagation type indicates the current type of signal propagation between said certain positioning base station and said certain positioning tag determined on the basis of the first determination result and second determination result of one of the multiple specific features; and determining the current type of signal propagation between said certain positioning base station and said certain positioning tag on the basis of the multiple candidate signal propagation types.

6. An apparatus for detecting a signal propagation type, comprising:

a computing module, configured to compute, when a certain positioning base station of an ultra-wideband positioning system currently receives a pulse response from a certain positioning tag, a value of a specified feature at least using the received pulse response, to serve as an actual value of the specified feature of the received pulse response;

a selecting module, configured to select, for the specified feature, a predictive model for predicting an adopted value of the specified feature at a future moment on the basis of an adopted value of the specified feature at a historical moment, according to the type of signal propagation between said certain positioning base station and said certain positioning tag determined last time;

an acquiring module, configured to use the predictive model selected for the specified feature to acquire an adopted value of the specified feature at a future moment, to serve as a predicted value of the specified feature of the received pulse response, by regarding an actual value of the specified feature of a historical pulse response received by said certain positioning base station from said certain positioning tag previously as an adopted value of the specified feature at a historical moment; and a determining module, configured to determine the current type of signal propagation between said certain positioning base station and said certain positioning tag on the basis of the actual value and predicted value of the specified feature of the received pulse response and the predictive model selected for the specified feature.

7. The apparatus as claimed in claim 6, wherein the specified feature only comprises a single feature, and the received pulse response only comprises a single pulse response, wherein the determining module comprises:

a module for acquiring a first determination result, indicating whether the difference between the actual value and predicted value of the single feature of the single pulse response is smaller than a specified threshold;

a module for acquiring a second determination result, indicating whether a signal propagation change situation suitable for prediction by the predictive model selected for the single feature is that signal propagation between the positioning base station and positioning tag is, both before and after the change, the type of signal propagation between said certain positioning base station and said certain positioning tag determined last time; and a module for determining the current type of signal propagation between said certain positioning base station and said certain positioning tag on the basis of the first determination result and the second determination result.

8. The apparatus as claimed in claim 6, wherein the specified feature comprises multiple specific features, the received pulse response only comprises a single pulse response, the selected predictive model comprises multiple predictive models, each predictive model being selected for one of the multiple specific features and used to predict an adopted value of said one specific feature at a single future moment on the basis of an adopted value of said one specific feature at a historical moment, and the determining module comprises:

a module for acquiring respective first determination results of the multiple specific features, wherein the first determination result of each specific feature indicates whether the difference between the actual value and predicted value of the specific feature of the single pulse response is smaller than a specified threshold;

a module for acquiring respective second determination results of the multiple specific features, wherein the second determination result of each specific feature indicates whether a signal propagation change situation suitable for prediction by the predictive model selected for the specific feature is that signal propagation between the positioning base station and positioning tag is, both before and after the change, the type of signal propagation between said certain positioning base station and said certain positioning tag determined last time;

a module for acquiring multiple candidate signal propagation types, wherein each candidate signal propagation type indicates the current type of signal propagation between said certain positioning base station and said certain positioning tag determined on the basis of the first determination result and second determination result of one of the multiple specific features; and a module for determining the current type of signal propagation between the positioning base station and the positioning tag on the basis of the multiple candidate signal propagation types.

9. The apparatus as claimed in claim 6, wherein
the specified feature only comprises a single feature,
the received pulse response comprises multiple pulse responses,
the predictive model selected for the single feature is used to predict adopted values of the single feature at multiple future moments on the basis of an adopted value of the single feature at a historical moment,
the acquiring module is further configured to: use the predictive model selected for the single feature to acquire adopted values of the single feature at multiple future moments, to serve as predicted values of the single feature of the multiple pulse responses, by regarding an actual value of the single feature of a historical pulse response received by said certain positioning base station from said certain positioning tag previously as an adopted value of the single feature at a historical moment, and
the determining module comprises:
a module for acquiring respective first indication values of the multiple pulse responses, wherein the first indication value of each pulse response indicates the difference between the actual value and predicted value of the single feature of the pulse response;
a module for acquiring a second indication value, computed on the basis of the first indication values of the multiple pulse responses;
a module for acquiring a first determination result, indicating whether the second indication value is smaller than a specified threshold;
a module for acquiring a second determination result, indicating whether a signal propagation change situation suitable for prediction by the predictive model selected for the single feature is that signal propagation between the positioning base station and positioning tag is, both before and after the change, the type of signal propagation between said certain positioning base station and said certain positioning tag determined last time; and
a module for determining the current type of signal propagation between said certain positioning base station and said certain positioning tag on the basis of the first determination result and the second determination result.

10. The apparatus as claimed in claim 6, wherein
the specified feature comprises multiple specific features,
the received pulse response comprises multiple pulse responses,
the selected predictive model comprises multiple predictive models, each predictive model being selected for one of the multiple specific features and used to predict an adopted value of said one specific feature at multiple future moments on the basis of an adopted value of said one specific feature at a historical moment,
the acquiring module is further configured to: by regarding an actual value of any one of the multiple specific features of a historical pulse response received by said certain positioning base station from said certain positioning tag previously as an adopted value of said any one specific feature at a historical moment, use the predictive model selected for said any one specific feature to acquire adopted values of said any one specific feature at multiple future moments, to serve as predicted values of said any one specific feature of the multiple pulse responses, and
the determining module comprises:
a module for acquiring respective first indication values of the multiple specific features of any one of the multiple pulse responses, wherein the first indication value of each specific feature of said any one pulse response indicates the difference between the actual value and predicted value of the specific feature of said any one pulse response;
a module for acquiring respective second indication values of the multiple specific features, wherein the second indication value of each specific feature is computed on the basis of the respective first indication values of the specific feature of the multiple pulse responses;
a module for acquiring respective first determination results of the multiple specific features, the first determination result of each specific feature indicating whether the second indication value of the specific feature is smaller than a specified threshold;
a module for acquiring respective second determination results of the multiple specific features, wherein the second determination result of each specific feature indicates whether a signal propagation change situation suitable for prediction by the predictive model selected for the specific feature is that signal propagation between the positioning base station and positioning tag is, both before and after the change, the type of signal propagation between said certain positioning base station and said certain positioning tag determined last time;
a module for acquiring multiple candidate signal propagation types, wherein each candidate signal propagation type indicates the current type of signal propagation between said certain positioning base station and said certain positioning tag determined on the basis of the first determination result and second determination result of one of the multiple specific features; and
a module for determining the current type of signal propagation between said certain positioning base station and said certain positioning tag on the basis of the multiple candidate signal propagation types.

11. A computing device, comprising:
a processor; and
a memory, in which is stored an executable instruction which, when executed, causes the processor to execute the method as claimed in claim 1.

12. A machine-readable storage medium, having an executable instruction thereon; when the executable instruction is executed, a machine is caused to execute the method as claimed in claim 1.

* * * * *